(12) United States Patent
Tanaka et al.

(10) Patent No.: US 10,346,323 B2
(45) Date of Patent: Jul. 9, 2019

(54) DATA TRANSFER DEVICE AND DATA TRANSFER METHOD FOR SMOOTHING DATA TO A COMMON BUS

(71) Applicant: OLYMPUS CORPORATION, Hachioji-shi, Tokyo (JP)

(72) Inventors: Yoshinobu Tanaka, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/813,853

(22) Filed: Nov. 15, 2017

(65) Prior Publication Data

US 2018/0074979 A1    Mar. 15, 2018

Related U.S. Application Data

(63) Continuation of application No. PCT/JP2016/066394, filed on Jun. 2, 2016.

(30) Foreign Application Priority Data

Jun. 15, 2015   (JP) .................. 2015-120449

(51) Int. Cl.
   *G06F 13/36*     (2006.01)
   *G06F 13/16*     (2006.01)
   (Continued)

(52) U.S. Cl.
   CPC .......... *G06F 13/1673* (2013.01); *G06F 13/36* (2013.01); *G06F 13/362* (2013.01); *G06F 13/38* (2013.01); *G06F 13/4031* (2013.01)

(58) Field of Classification Search
   CPC .. G06F 13/1673; G06F 13/4031; G06F 13/36; G06F 13/362; G06F 13/03
   See application file for complete search history.

(56) References Cited

U.S. PATENT DOCUMENTS

| 2008/0040530 A1* | 2/2008 | Takeda ................. G06F 13/28 710/308 |
| 2010/0149376 A1* | 6/2010 | Kiba ................... H04N 5/3765 348/231.2 |

(Continued)

FOREIGN PATENT DOCUMENTS

| JP | 2002-135663 A | 5/2002 |
| JP | 2006-39672 A | 2/2006 |

(Continued)

OTHER PUBLICATIONS

International Search Report dated Aug. 23, 2016, issued in counterpart application No. PCT/JP2016/066394, w/English translation. (4 pages).

(Continued)

Primary Examiner — Jing-Yih Shyu
(74) Attorney, Agent, or Firm — Westerman, Hattori, Daniels & Adrian, LLP

(57) ABSTRACT

A data transfer device includes a buffer unit temporarily storing transfer data to be transferred to a common bus, a write control unit writing input data as the transfer data to the buffer unit and outputs a notification signal, a read control unit reading the transfer data from the buffer unit, an interface unit transferring the transfer data to the common bus according to a predetermined bus protocol, and a band-smoothing unit which smoothes a band of the common bus by delaying the notification signal, generating a read control signal, and outputting the read control signal to the read control unit, wherein when previous transfer data which has been read from the buffer unit already exists and a DMA transfer receipt ACK responding to a DMA transfer request REQ is received by the interface unit, the read control unit reads current transfer data from the buffer unit.

3 Claims, 15 Drawing Sheets

(51) Int. Cl.
G06F 13/362 (2006.01)
G06F 13/38 (2006.01)
G06F 13/40 (2006.01)

(56) References Cited

U.S. PATENT DOCUMENTS

| | | | | |
|---|---|---|---|---|
| 2010/0214441 | A1* | 8/2010 | Yanada | H04N 5/232 348/231.2 |
| 2013/0013832 | A1* | 1/2013 | Tanaka | G06F 13/14 710/119 |
| 2013/0124765 | A1* | 5/2013 | Nakazono | G06F 13/00 710/110 |
| 2013/0124929 | A1* | 5/2013 | Harada | G06F 11/00 714/49 |
| 2015/0339546 | A1* | 11/2015 | Ito | G06K 15/181 358/1.15 |

FOREIGN PATENT DOCUMENTS

| | | |
|---|---|---|
| JP | 2010-141687 A | 6/2010 |
| JP | 2010-199880 A | 9/2010 |
| JP | 2015-053643 A | 3/2015 |

OTHER PUBLICATIONS

Office Action dated Apr. 2, 2019, issued in counterpart JP application No. 2015-120449, with English translation. (4 pages).

\* cited by examiner

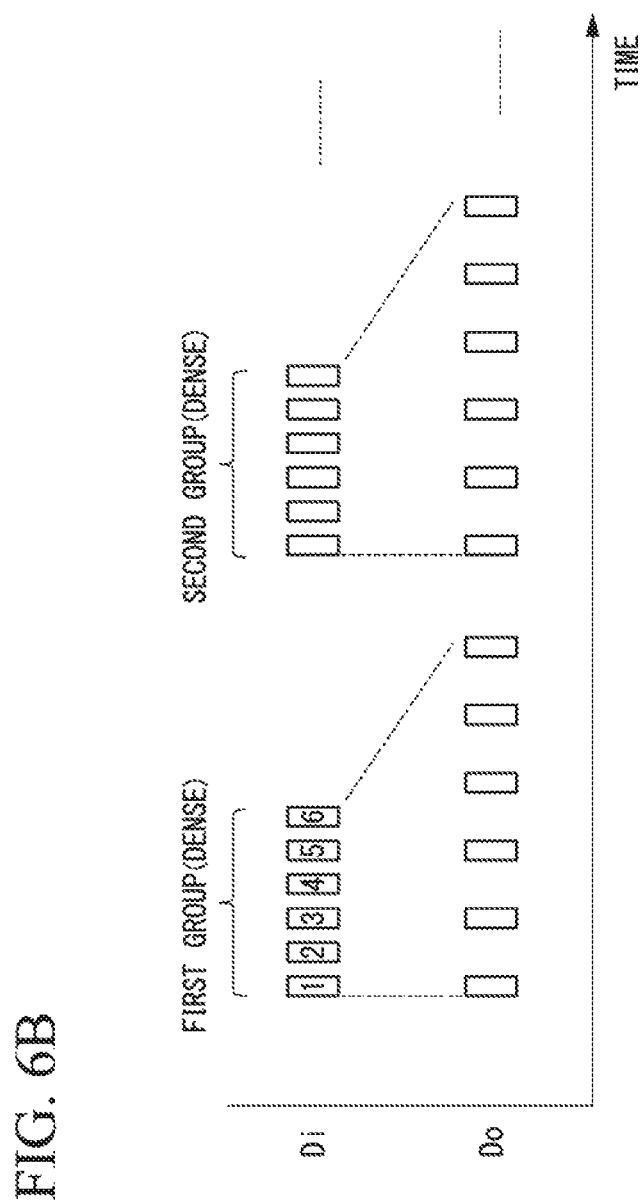

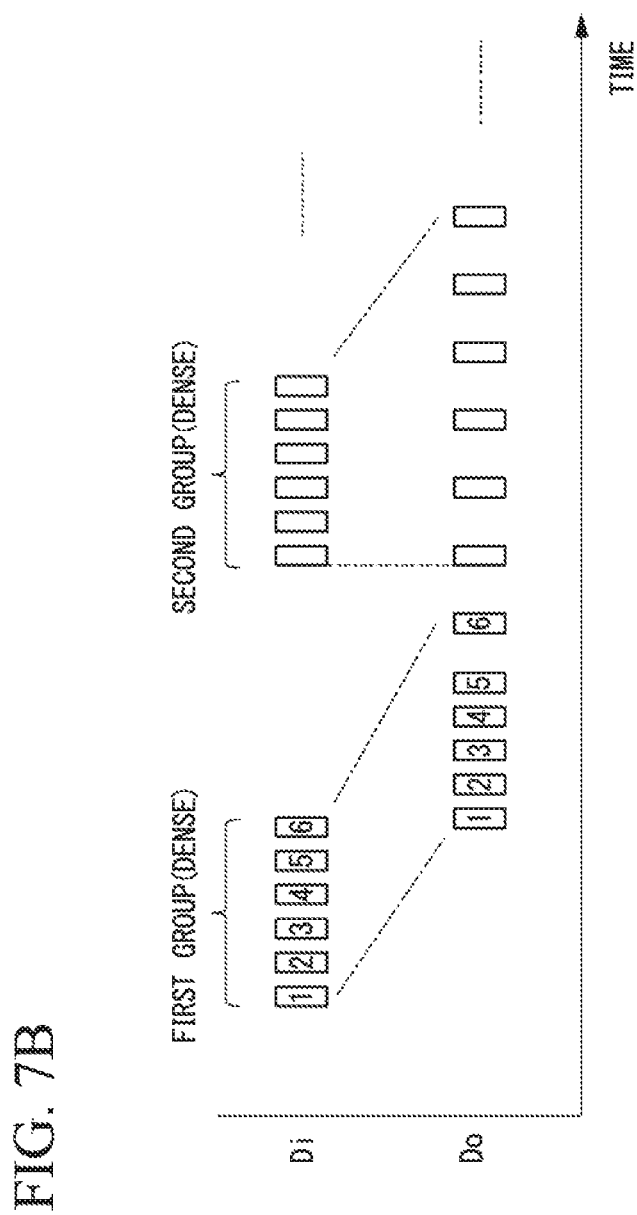

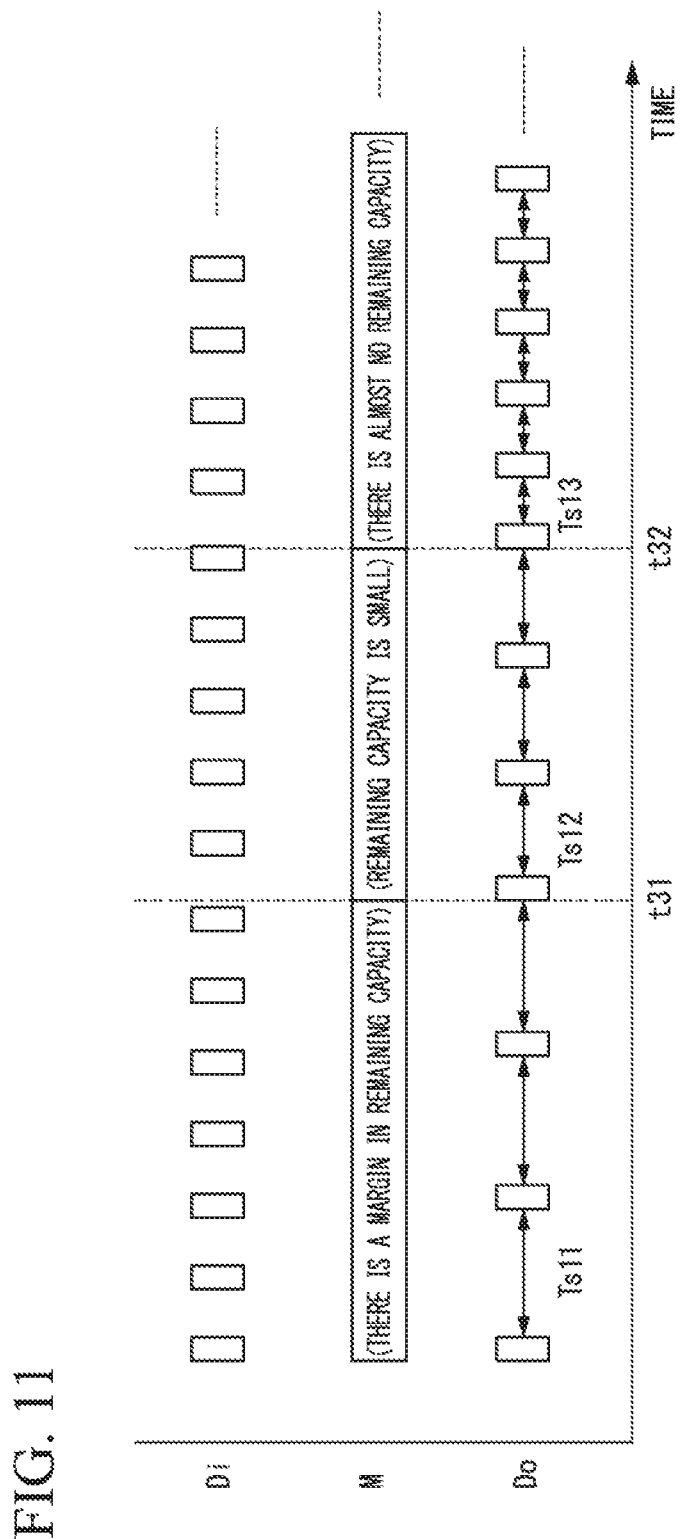

DATA TRANSFER DEVICE AND DATA TRANSFER METHOD FOR SMOOTHING DATA TO A COMMON BUS

This application is a continuation application based on a PCT International Application No. PCT/2016/066394, filed on Jun. 2, 2016, whose priority is claimed on Japanese Patent Application No. 2015-120449, filed on Jun. 15, 2015. The contents of both of the PCT International Application and the Japanese Patent Application are incorporated herein by reference.

BACKGROUND OF THE INVENTION

Field of the Invention

The present invention relates to a data transfer device and a data transfer method.

Description of Related Art

Conventionally, an imaging system such as a digital camera includes a plurality of large-scale integrations (LSI) to which various functional blocks are assigned. The plurality of LSIs are connected to a common bus for direct memory access (DMA). A plurality of functional blocks respectively assigned to the plurality of LSIs share one dynamic random access memory (DRAM) via a common bus. This type of imaging system includes a bus arbiter.

The bus arbiter controls the access to the DRAM by each functional block by adjusting and receiving DMA transfer requests of functional blocks accessing the DRAM. Specifically, the bus arbiter performs arbitration to preferentially receive DMA transfer requests of functional blocks responsible for high-priority processes while increasing the efficiency of use of the common bus as much as possible, for example, by reducing a band loss of the common bus occurring upon bank switching or a band loss of the common bus occurring upon switching between read and write operations.

Generally, according to the arbitration performed by the bus arbiter, when a high-priority functional block consecutively outputs DMA transfer requests, a situation may occur in which bus ownership does not pass to other functional blocks and processes of the other functional blocks are stagnated. A related-art technology for solving this problem is disclosed in Japanese Unexamined Patent Application, First Publication No. 2006-39672 1. According to the technology disclosed in the Japanese Unexamined Patent Application, First Publication No. 2006-39672 1, a high-priority functional block outputs DMA transfer requests at a constant time interval such that it is possible for the bus arbiter to receive DMA transfer requests of low-priority functional blocks even if there are consecutive DMA transfer requests of a high-priority functional block.

SUMMARY OF THE INVENTION

According to a first aspect of the present invention, a data transfer device includes a buffer unit configured to temporarily store transfer data that is to be transferred to a common bus, a write control unit configured to write input data as the transfer data to the buffer unit and the write control unit configured to output a notification signal indicating that the input data has been written to the buffer unit, a read control unit configured to read the transfer data from the buffer unit, an interface unit configured to transfer the transfer data read from the buffer unit by the read control unit to the common bus according to a predetermined bus protocol, and a band-smoothing unit configured to smooth a band of the common bus by delaying the notification signal, generating a read control signal for controlling a timing at which the transfer data is read from the buffer unit, and outputting the read control signal to the read control unit, wherein when previous transfer data which has been read from the buffer unit in response to a previous read control signal already exists and a DMA transfer receipt ACK in response to a DMA transfer request REQ of the previous transfer data is received by the interface unit, the read control unit reads current transfer data from the buffer unit.

According to a second aspect of the present invention, in the data transfer device according to the first aspect, the band-smoothing unit may be configured to sequentially output the notification signals as the control signals to the read control unit at a predetermined time interval by delating the notification signals which are sequentially output from the write control unit according to a process that pieces of pixel data forming the input data are sequentially written to the buffer unit by the write control unit.

According to a third aspect of the present invention, in the data transfer device according to the second aspect, the band-smoothing unit may include a FIFO memory configured to hold the notification signals sequentially output from the write control unit, a first counter configured to count the number of the notification signals that have not been read among the notification signals held in the FIFO memory in response to each of the notification signals sequentially output from the write control unit, a second counter configured to count a count value up by ones at a predetermined period for providing the predetermined time interval until a predetermined count value is reached, the second counter being initialized at a timing at which the FIFO memory is read, and a read determination unit configured to read the notification signal from the FIFO memory, the notification signal having not been read from the FIFO memory, and the read determination unit configured to output the read notification signal as the control signal, when the count value of the second counter has reached the predetermined count value and the count value of the first counter indicates that the notification signal which has not been read from the FIFO memory is present in the FIFO memory.

According to a fourth aspect of the present invention, a data transfer method includes a first step of writing input data to a buffer unit as transfer data that is to be transferred to a common bus and outputting a notification signal indicating that the input data has been written to the buffer unit, a second step of delaying the notification signal and generating a read control signal for reading the transfer data from the buffer unit such that a band of the common bus is smoothed, a third step of reading the transfer data from the buffer unit in response to the read control signal, and a fourth step of transferring the transfer data read from the buffer unit to the common bus according to a predetermined bus protocol wherein when previous transfer data which has been read from the buffer unit in response to a previous read control signal already exists and a DMA transfer receipt ACK in response to a DMA transfer request REQ of the previous transfer data is generated, the third step furtherly includes a step of reading current transfer data from the buffer unit.

BRIEF DESCRIPTION OF DRAWINGS

FIG. 6B is a diagram explaining an operation of the data transfer device according to the first embodiment of the present invention and explaining the relationship between input data and output data when it takes a short time until a DMA transfer request is received.

FIG. 7B is a diagram explaining an operation of the data transfer device according to the first embodiment of the present invention and explaining the relationship between input data and output data when it takes a long time until a DMA transfer request is received.

FIG. 11 is a diagram explaining an operation of the band-smoothing unit included in the data transfer device according to the third embodiment of the present invention and explaining the relationship between the remaining capacity of a buffer unit and the time interval between pieces of transfer data.

DETAILED DESCRIPTION OF THE INVENTION

Hereinafter, embodiments of the present invention will be described with reference to the drawings.

(First Embodiment)

Firstly, a first embodiment of the present invention will be described.

Figure 1:
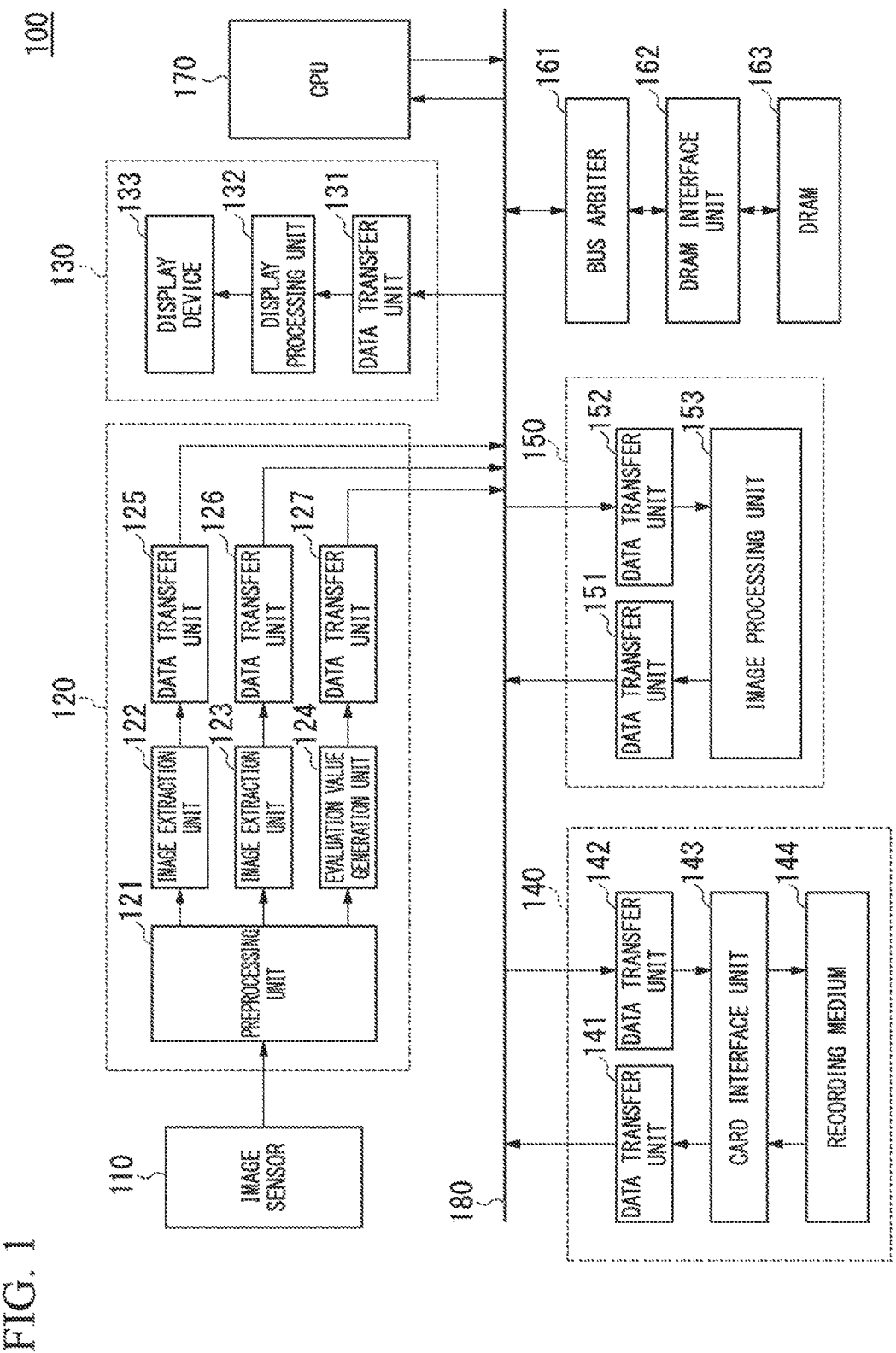
FIG. 1 is a block diagram showing an exemplary configuration of an imaging system to which a data transfer device according to a first embodiment of the present invention is applied.

FIG. 1 is a block diagram showing an exemplary configuration of an imaging system 100 to which a data transfer device according to the first embodiment of the present invention is applied.

The imaging system 100 is, for example, a digital camera. The imaging system 100 includes an image sensor 110, functional blocks 120 to 150, a bus arbiter 161, a DRAM interface unit 162, a DRAM 163, a central processing unit (CPU) 170, and a common bus 180. In FIG. 1, an optical system and the like for forming an optical image of a subject on an imaging surface of the image sensor 110 are omitted.

The image sensor 110 photoelectrically converts the optical image of the subject to generate pixel data (a pixel signal). The image sensor 110 is, for example, a charge-coupled device (CCD) image sensor or a complementary metal oxide semiconductor (CMOS) image sensor. The image sensor 110 outputs, for example, image data of the RGB colorimetric system.

The functional block 120 functions as a bus interface for outputting image data obtained toy the image sensor 110 to the common bus 180. The functional block 120 includes a preprocessing unit 121, image extraction units 122 and 123, an evaluation value generation unit 124, and data transfer units 125 to 127. The preprocessing unit 121 performs preprocessing such as scratch correction or shading correction on the image data obtained by the image sensor 110. The image extraction units 122 and 123 extract image data of a display image, a recording image, or the like from the image data by cutting out part of the image data obtained by the image sensor 110. The evaluation value generation unit 124 generates evaluation values used for control of exposure, white balance, focus, or the like. The data transfer unit 125 transfers the image data extracted by the image extraction unit 122 to the common bus 180. The data transfer unit 126 transfers the image data extracted by the image extraction unit 123 to the common bus 180. The data transfer unit 127 transfers the evaluation values generated by the evaluation value generation unit 124 to the common bus 180.

The functional block 130 displays an image. The functional block 130 includes a data transfer unit 131, a display-processing unit 132, and a display device 133. The data transfer unit 131 transfers an image data of an image that is to be displayed on the display device 133 (hereinafter referred to as a display image) from the common bus 180 to the display-processing unit 132. The display-processing unit 132 acquires image data of a display image from the DRAM 163 and the display-processing unit 132 performs display processing such as on-screen display (OSD) super imposition processing on the image data. The display device 133 visualizes the image data processed by the display-processing unit 132. The display device 133 is, for example, a thin film transistor (TFT) liquid crystal device or an organic electroluminescence (EL) display device.

The functional block 140 stores an image data. The functional block 140 includes data transfer units 141 and 142, a card interface unit 143, and a recording medium 144. The data transfer unit 141 transfers image data provided from the card interface unit 143 to the common bus 180. The data transfer unit 142 transfers image data provided from the common bus 180 to the card interface unit 143. The card interface unit 143 reads image data from the DRAM 163 and writes the read image data to the recording medium 144 and reads image data from the recording medium 144 and writes the read image data to the DRAM 163. The recording medium 144 is a memory card that can be attached to and detached from the card interface unit 143 such as a compact flash (CF) or secure digital (SD) card.

The functional block 150 performs predetermined image processing such as noise-removal processing, YC conversion processing, resizing processing, or JPEG compression processing on image data (preprocessed image data) stored in the DRAM 163 to generate a display image or a recording image. The functional block 150 includes data transfer units 151 and 152 and an image-processing unit 153. The data transfer unit 151 transfers image data provided from the image-processing unit 153 to the common bus 180. The data transfer unit 152 transfers image data provided from the common bus 180 to the image-processing unit 153. The image-processing unit 153 performs the predetermined image processing. The image data that has been subjected to the predetermined image processing by the image-processing unit 153 is transferred to and stored in the DRAM 163.

The bus arbiter 161 adjusts and receives DMA transfer requests output from the functional blocks 120 to 150 connected to the common bus 180. The bus arbiter 161 determines a functional block that is given a bus ownership for granting access to the DRAM 163. The DRAM interface unit 162 performs writing of image data to the DRAM 163 and reading of image data from the DRAM 163. The DRAM 163 is a semiconductor memory shared by the functional blocks 120 to 150. The DRAM 163 is, for example, a synchronous DRAM.

The central processing unit 170 controls the overall operation of the imaging system 100. Similar to the functional blocks 120 to 150 described above, the central processing unit 170 is one of the functional blocks sharing the DRAM 163.

The data transfer device according to the first embodiment corresponds to each of the data transfer units 125 to 127, 141 and 151 which output image data to the common bus 180, among the data transfer units 125 to 127, 131, 141, 142, 151, and 152 provided in the imaging system 100 described above. In the following description, the data transfer unit 125 provided in the functional block 120 will be mainly described and will be referred to as a "data transfer device 10."

The data transfer device according to the first embodiment may be applied to all data transfer units provided in the imaging system 100 shown in FIG. 1 or may be applied only to some of the data transfer units.

Figure 2:
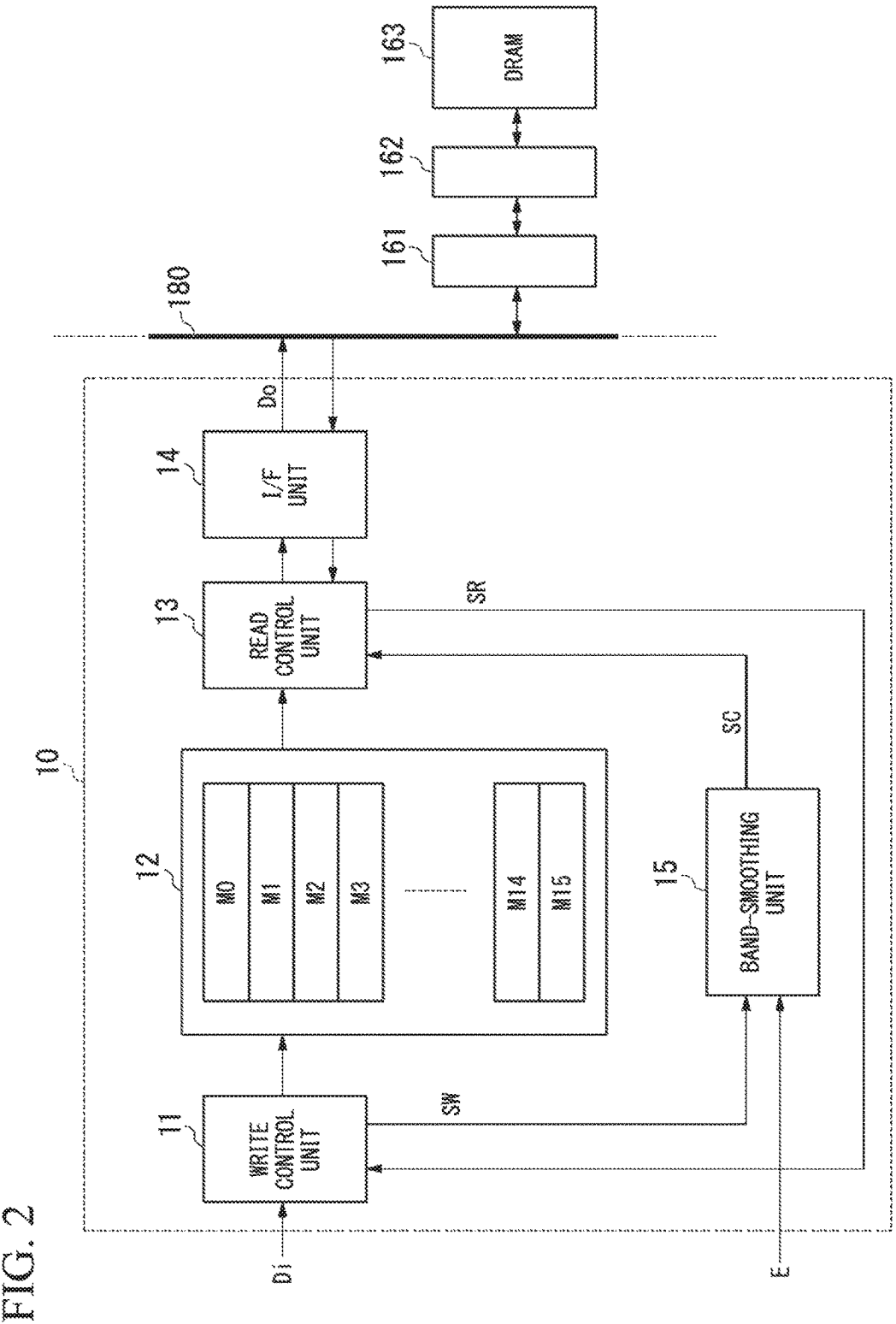
FIG. 2 is a block diagram showing an exemplary configuration of the data transfer device according to the first embodiment of the present invention.

FIG. 2 is a block diagram showing an exemplary configuration of the data transfer device 10 according to the first embodiment of the present invention.

The data transfer device 10 includes a write control unit 11, a buffer unit 12, a read control unit 13, an interface unit (I/F unit) 14, and a band-smoothing unit 15.

The band-smoothing unit 15 and the write control unit 11 may foe integrated or the band-smoothing unit 15 and the read control unit 13 may be integrated. The read control unit 13 and the interface unit 14 may also be integrated.

The write control unit 11 sequentially writes an input image data Di as a transfer data to the buffer unit 12, the input image date Di being formed from a data string of pixel data acquired by the image sensor 110. Each time writing of pixel data of a predetermined number of pixels (for example, pixel data of 32 pixels) forming the input image data Di is completed, the write control unit 11 outputs a write completion notification signal SW indicating that the input image data Di has been written to the buffer unit 12. The write completion notification signal SW includes address information indicating one of the storage areas M0 to M15 to which the input image data Di has been written. In the first embodiment, the write control unit 11 outputs the write completion notification signal SW each time writing of pixel data of 32 pixels forming the input image data Di is completed, but the present invention is not limited to this example.

Once the write control unit 11 receives a read completion notification signal SR from the read control unit 13, which will be described latter, the write control unit 11 specifies one of the storage areas M0 to M15 from which transfer data has been read based on the read completion notification signal SR (that is, an empty storage area). The write control unit 11 writes the input image data Di to the empty storage area.

The buffer unit 12 temporarily stores transfer data that is to be transferred to the common bus 180. The buffer unit 12 is formed of, for example, a static random access memory (SRSM). In the first embodiment, the buffer unit 12 includes a total of 16 storage areas M0 to M15. In each of the storage areas, pixel data of the predetermined number of pixels forming the input image data Di is stored as transfer data. In the first embodiment, pixel data of 32 pixels is stored in each of the storage areas M0 to M15. When pixel data of one pixel is 2 bytes, 64 (=2×32) bytes of pixel data is stored in each of the storage areas M0 to M15. Therefore, each of the storage areas M0 to M15 has a storage capacity of at least 64 bytes.

The buffer unit 12 stores pixel data forming the input image data Di in the storage areas in units of 64 bytes, sequentially from the storage area M0 to the storage area M15. Specifically, the buffer unit 12 stores 64-byte pixel data of the first 32 pixels forming the input image data Di in the first storage area M0 and stores 64-byte pixel data of the next 32 pixels in the storage area M1. Likewise, the buffer unit 12 sequentially stores the subsequent pixel data forming the input image data Di in the storage areas M2 to M15 in units of 64 bytes. When the input image data Di is stored in the last storage area M15, the buffer unit 12 again stores new subsequent pixel data forming the input image data Di in the storage areas in units of 64 bytes, sequentially from the first storage area M0 to the storage area M15. That is, pixel data of the input image data Di sequentially output from the image sensor 110 is cyclically written to the storage areas M0 to M15 of the buffer unit 12 by the write control unit 11. Hereinafter, writing of pixel data to the buffer unit 12 means writing of input image data Di to the storage areas M0 to M15 in units of 64 bytes corresponding to 32 pixels.

Regarding a configuration of the imaging system 100, when a write clock signal for writing input image data Di to the buffer unit 12 and a read clock signal for reading transfer data from the buffer unit 12 are different clock signals, for example, the buffer unit can be configured by using a type of SRAM (for example, a dual port SRAM) to which a write clock signal and a read clock signal can be input.

The read control unit 13 reads transfer data from the buffer unit 12 in response to a read control signal SC output from the band-smoothing unit 15. The read control signal SC will be described later. The read control signal SC is a signal obtained by delaying a write completion notification signal SW. Therefore, similar to the write completion notification signal SW, the read control signal SC includes information indicating that the input image data Di has been written to the buffer unit 12 and address information indicating the storage area to which the input image data Di has been written. Once the read control unit 13 receives the read control signal SC from the band-smoothing unit 15, the read control unit 13 reads pixel data as transfer data in units of 64 bytes corresponding to 32 pixels from the storage areas M0 to M15 of the buffer unit 12 indicated by the address information included in the read control signal SC. Hereinafter, reading of transfer data from the buffer unit 12 means reading of pixel data from the storage areas M0 to M15 as transfer data in units of 64 bytes corresponding to 32 pixels.

The read control unit 13 outputs a read completion notification signal SR to the write control unit 11 each time when the read control unit completes reading of transfer data of 64 bytes corresponding to 32 pixels from the buffer unit 12, wherein the read completion notification signal SR is used for indicating that the transfer data has been read. The read completion notification signal SR includes address information indicating the storage area of the buffer unit 12 in which the read transfer data has been stored (that is, information indicating an empty storage area).

The interface unit 14 transfers the transfer data, which has been read front the buffer unit 12 by the read control unit 13, to the common bus 180 according to a predetermined bus protocol. Specifically, in order to transfer the transfer data to the common bus 180, the interface unit 14 performs transmission of a DMA transfer request REQ, reception of a DMA transfer receipt ACK, transmission of an address ADD of the DRAM indicating the transfer destination of the transfer data, transmission of a main body of the transfer data (pixel data), and the like.

The band-smoothing unit 15 smoothes the band of the common bus 180. The band-smoothing unit 15 smoothes the band of the common bus 180 by controlling the timings at which the read control unit 13 reads transfer data from the buffer unit 12 based on write completion notification signals SW input by the write control unit 11. The band-smoothing unit 15 generates read control signals SC by delaying write completion notification signals SW input by the write control unit 11 and the band-smoothing unit 15 outputs the generated read control signals SC to the read control unit 13, the read control signals being used for controlling the timings at which transfer data is read from the buffer unit 12. Delaying write completion notification signals SW means smoothing the write completion notification signals SW. Thus, read control signals SC generated by delaying write completion notification signals SW are the write completion notification signals SW that have been smoothed.

Specifically, the band-smoothing unit 15 sequentially outputs the write completion notification signals as the control signals to the read control unit 13 at a predetermined time interval by delaying the write completion notification signals SW which are sequentially output from the write control unit 11, according to that the pixel data forming the input image data Di is sequentially written to the buffer unit 12 by the write control unit 11. A setting signal E for setting the predetermined time interval is input to the band-smoothing unit 15 from the central processing unit 170 (FIG. 1). The setting signal E may also be input to the band-smoothing unit 15 directly from the outside. Details of the band-smoothing unit 15 will be described later.

Figure 3:
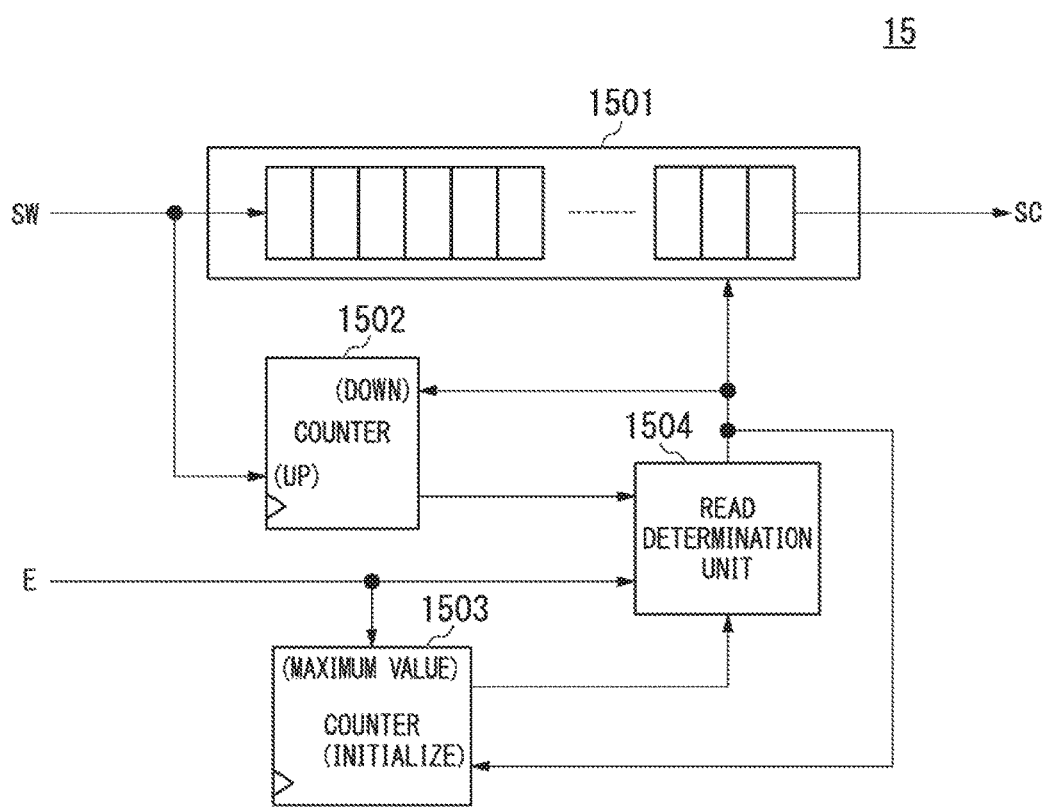
FIG. 3 is a block diagram showing an exemplary configuration of a band-smoothing unit included in the data transfer device according to the first embodiment of the present invention.

FIG. 3 is a block diagram showing an exemplary configuration of the band-smoothing unit 15 included in the data transfer device 10 according to the first embodiment of the present invention.

The band-smoothing unit 15 includes a first-in first-out (FIFO) memory 1501, a counter (first counter) 1502, a counter (second counter) 1503, and a read determination unit 1504.

The FIFO memory 1501 temporarily holds write completion notification signals SW that are sequentially output from the write control unit 11. The FIFO memory 1501 includes, for example, a plurality of cascaded-connected registers. The FIFO memory 1501 delays the write completion notification signal SW and outputs the write completion notification signal SW as a read control signal SC in accordance with a FIFO read command received from the read determination unit 1504, by temporarily holding a write completion notification signal SW.

In response to each write completion notification signal SW sequentially output from the write control unit 11, the counter (first counter) 1502 counts the number of write completion notification signals SW which have not been read from the FIFO memory 1501 among write completion notification signals SW already stored in the FIFO memory 1501. The counter 1502 counts up by ones each time a write completion notification signal SW is input from the write control unit 11 to the FIFO memory 1501. The counter 1502 also counts down by ones each time a write completion notification signal SW is read from the FIFO memory 1501.

The count value of the counter 1502 indicates a difference (a natural number including zero) between the number of write completion notification signals SW that have been input to the FIFO memory 1501 and the number of write completion notification signals SW that have been output from the FIFO memory 1501. Therefore, from the count value of the counter 1502, if is possible to determine the presence or absence of any write completion notification signals SW that have not been read from the FIFO memory 1501. If the count value of the counter 1502 is 1 or more, a write completion notification signal SW which has not been read from the FIFO memory 1501 is present in the FIFO memory 1501. If the count value of the counter 1502 is 0, all the write completion notification signals SW input to the FIFO memory 1501 have been read and no write completion notification signals SW which have not been read from the FIFO memory 1501 are present in the FIFO memory 1501.

The counter (second counter) 1503 counts up by ones at a predetermined period until the count value thereof reaches a maximum of the count value which is set in the counter 1503 by the setting signal E. When the count value of the counter 1503 reaches the maximum value set by the setting signal E, the counter 1503 outputs a signal indicating that the count value has reached the maximum value to the read determination unit 1504 and the counter 1503 is thereafter initialized at the read timing of the FIFO memory 1501. That is, the count value of the counter 1503 is initialized each time a write completion notification signal SW is read from the FIFO memory 1501. Specifically, when the read determination unit 1504 outputs a FIFO read command, the counter 1503 is initialized in response to the FIFO read command. After being initialized, the counter 1503 counts up by ones repeatedly until the count value reaches the maximum value or until it is reinitialized.

A time interval Ts at which read control signals SC are sequentially output from the band-smoothing unit 15 is determined based on the maximum of the count value which is set in the counter 1503 by the setting signal E. As the maximum value set in the counter 1503 increases, the time interval Ts (see FIG. 6) between read control signals SC increases. In this case, there is a tendency for the data transfer speed to decrease while the degree of band smoothing of the common bus 180 increases. Conversely, as the maximum value decreases, the time interval between read control signals SC decreases. In this case, there is a tendency for the data transfer speed to increase while the smoothing of the common bus 180 is suppressed. The maximum of the count value can be arbitrarily set in the counter 1503 by the setting signal E according to a required data transfer speed, a required degree of the band smoothing of the common bus 180, or the like.

The read determination unit 1504 controls reading of the FIFO memory 1501 based on the count values of the counters 1502 and 1503. That is, when the count value of the counter 1503 has reached a predetermined value determined based on the maximum value and the count value of the counter 1502 is a value indicating that a write completion notification signal SW which has not been read from the FIFO memory 1501 is present in the FIFO memory 1501, the read determination unit 1504 outputs a FIFO read command to the FIFO memory 1501 for instructing to read a write completion notification signal SW.

The read determination unit 1504 reads and output a write completion notification signal SW as a read control signal SC from the FIFO memory 1501 by outputting the FIFO read command to the FIFO memory 1501, wherein the write completion notification signal SW has not been read from the FIFO memory 1501. At this time, read control signals SC are each output sequentially from the FIFO memory 1501 of the band-smoothing unit 15 to the read control unit 13 at a predetermined time interval Ts (see FIG. 6), wherein the predetermined time interval Ts is determined by the maximum of the count value set in the counter 1503. As read control signals SC are input to the read control unit 13 at the time interval Ts in this manner, the band of the common bus 180 is smoothed as will be described later.

Next, an operation of the data transfer device 10 (a data transfer method) according to the first embodiment will be described with reference to FIGS. 5A to 7B along a flow shown in FIG. 4.

Figure 4:
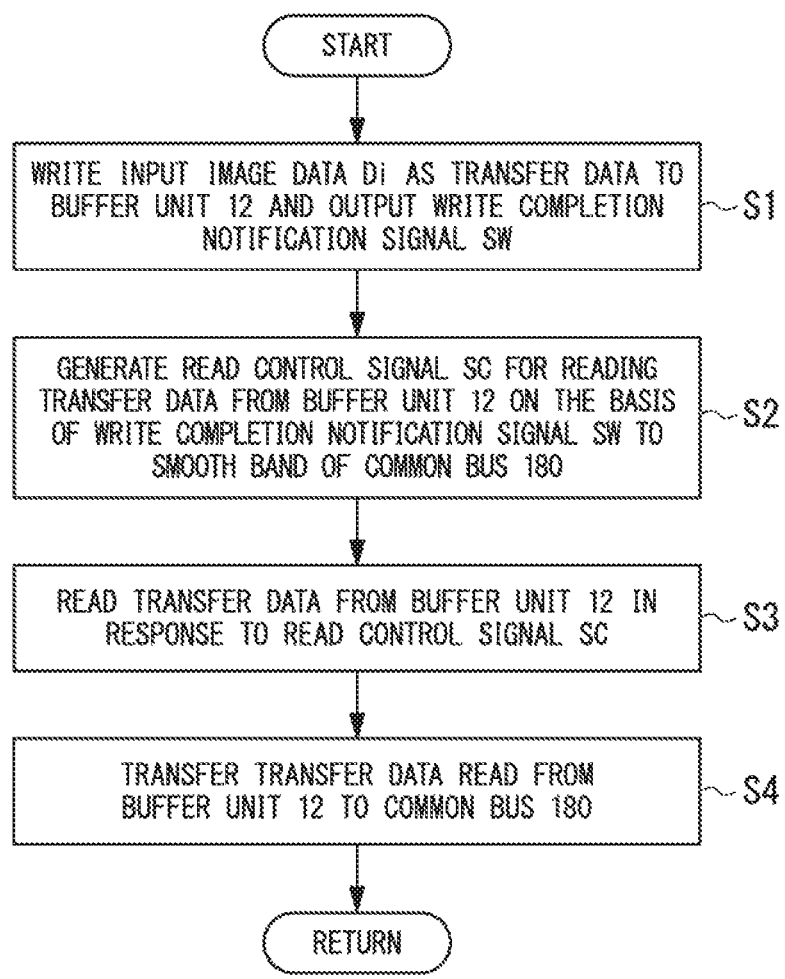
FIG. 4 is a flowchart showing an example of an operation flow of the data transfer device according to the first embodiment of the present invention.
Figure 6A:
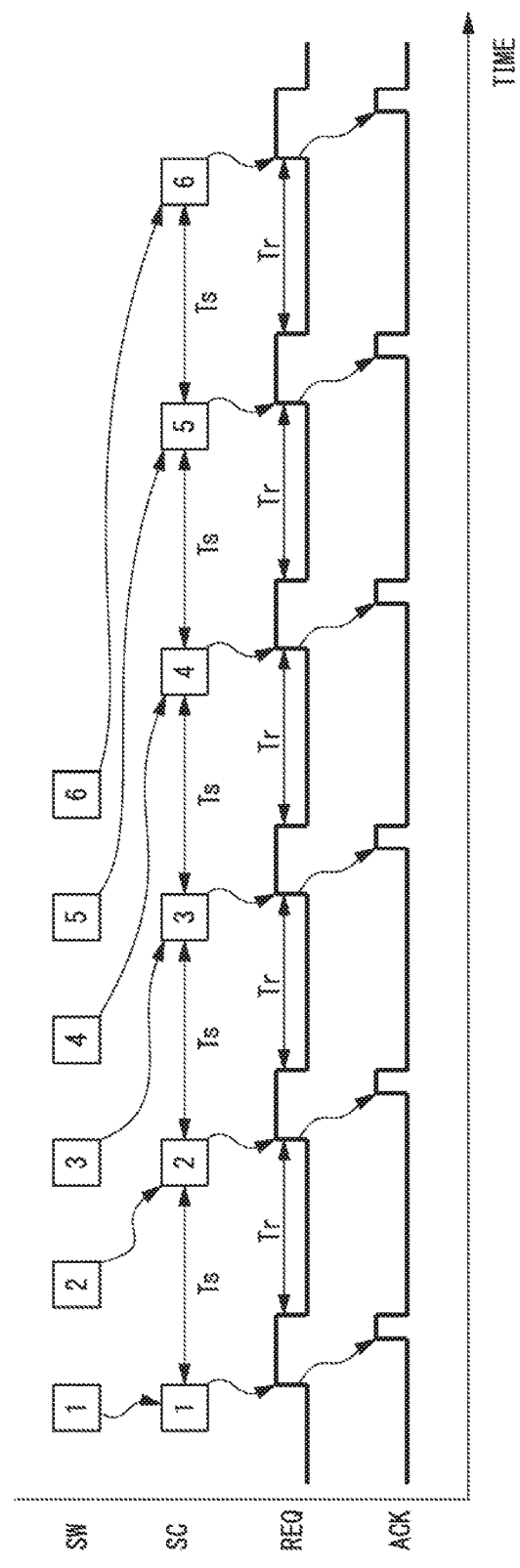
FIG. 6A is a diagram explaining an operation of the data transfer device according to the first embodiment of the present invention and explaining an operation when it takes a short time until a DMA transfer request is received.
Figure 7A:
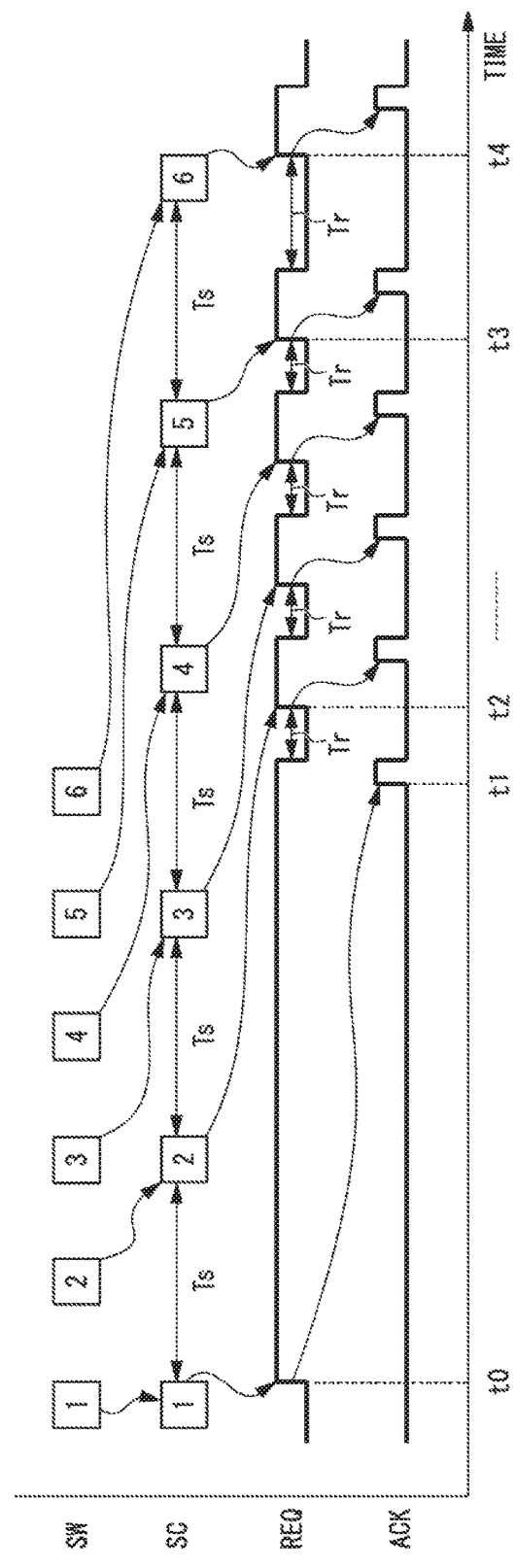
FIG. 7A is a diagram explaining an operation of the data transfer device according to the first embodiment of the present invention and explaining an operation when it takes a long time until a DMA transfer request is received.

FIG. 4 is a flowchart showing an example of an operation flow of the data transfer device 10 according to the first embodiment of the present invention. FIGS. 5A to 5D are diagrams explaining an operation of the data transfer device 10 according to the first embodiment of the present invention, and explaining an example of image data to be transferred. FIGS. 6A and 6B are diagrams explaining an operation of the data transfer device 10 according to the first embodiment of the present invention. FIG. 6A is a timing chart explaining an operation when it takes a short time until a DMA transfer request is received. FIG. 6B is a diagram explaining the relationship between input image data Di and output transfer data Do when it takes a short time until a DMA transfer request is received. FIGS. 7A and 7B are diagrams explaining an operation of the data transfer device 10 according to the first embodiment of the present invention. FIG. 7A is a timing chart explaining an operation when it takes a long time until a DMA transfer request is received.

FIG. 7B is a diagram explaining the relationship between input image data Di and output transfer data Do when it takes a long time until a DMA transfer request is received.

To facilitate the understanding of the effects of the first embodiment, it is assumed that an area in which pixel data is densely included and an area in which pixel data is sparsely included are present in input image data Di. Generally, when input image data Di including dense pixel data is transferred from a functional block to the common bus 180, the functional block consecutively outputs DMA transfer requests. Therefore, during a period in which the functional block outputs DMA transfer requests, a situation may occur in which DMA transfer requests of other functional blocks cannot be received by the bus arbiter. In order to avoid this situation, the band of the common bus 180 is smoothed as described in the first embodiment. However, smoothing the band of the common bus 180 may limit DMA transfer requests and decrease the data transfer speed. Therefore, according to the present embodiment, an effect of making it possible to suppress the decrease in the data transfer speed while smoothing the band of the common bus 180 is achieved.

FIGS. 5A to 5D show an example of an imaging screen B corresponding to input image data Di which includes areas in which pixel data to be subjected to data transfer by the data transfer device 10 is densely included and areas in which pixel data is sparsely included. The imaging screen P shown in FIG. 5A includes image areas A1 to A3 in Which images (pixel data to be transferred) are picked up and image areas (other than the image areas A1 to A3) in which almost none image is picked up. Pixel data for displaying the image areas A1 to A3 is densely included in input image data Di acquired from the image sensor 110. In other words, pixel data is densely included in the image areas A1 to A3 (dense areas). On the other hand, the input image data Di includes almost no pixel data for displaying areas other than the image areas A1 to A3. In other words, almost none pixel data is included in areas (sparse areas) other than the image areas A1 to A3. Therefore, areas (dense areas) in which pixel data is densely included and areas (sparse areas) in which pixel data is scarcely included are alternately present in input image data Di which is sequentially output from the image sensor 110 along the scanning line of the imaging screen P shown in FIG. 5A.

Figure 5A:
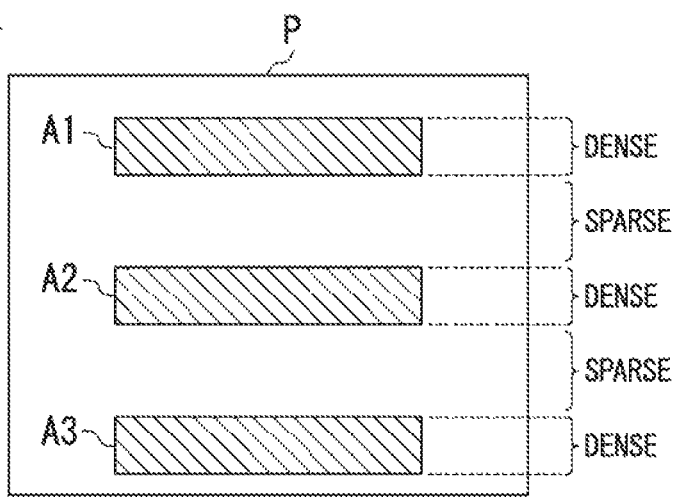
FIG. 5A is a diagram explaining an operation of the data transfer device according to the first embodiment of the present invention and explaining an example of image data to be transferred.
Figure 5B:
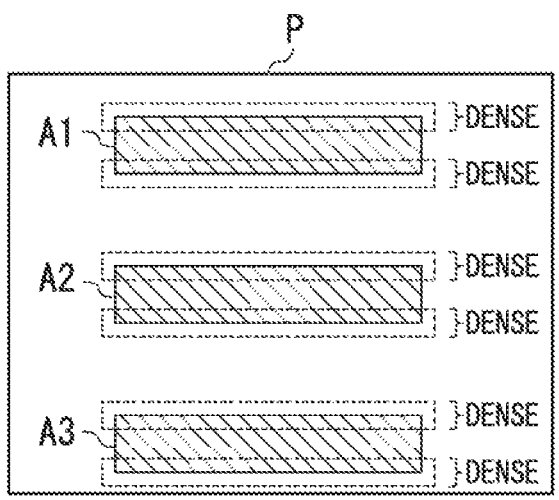
FIG. 5B is a diagram explaining an operation of the data transfer device according to the first embodiment of the present invention and explaining an example of image data to be transferred.

Similar to the example shown in FIG. 5A, an imaging screen P shown in FIG. 5B includes image areas A1 to A3 in which images (pixel data to be transferred) are picked up and image areas (other than the image areas A1 to A3) in which almost none image is picked up. However, in the example of FIG. 5B, pixel data to foe actually transferred is only partial pixel data in upper portions of the image areas A1 to A3 indicated by dotted lines and partial pixel data in lower portions thereof. In this case, pixel data of areas indicated by the dotted lines is densely included in the input image data Di (as in dense areas). Almost none pixel data in other areas is included in the input image data Di (as in sparse areas). Also in this case, areas (dense areas) in which pixel data is densely included and areas (sparse areas) in which pixel data is scarcely included are alternately present in input image data Di which is sequentially output from the image sensor 110 along the scanning line of the imaging screen P.

Figure 5C:
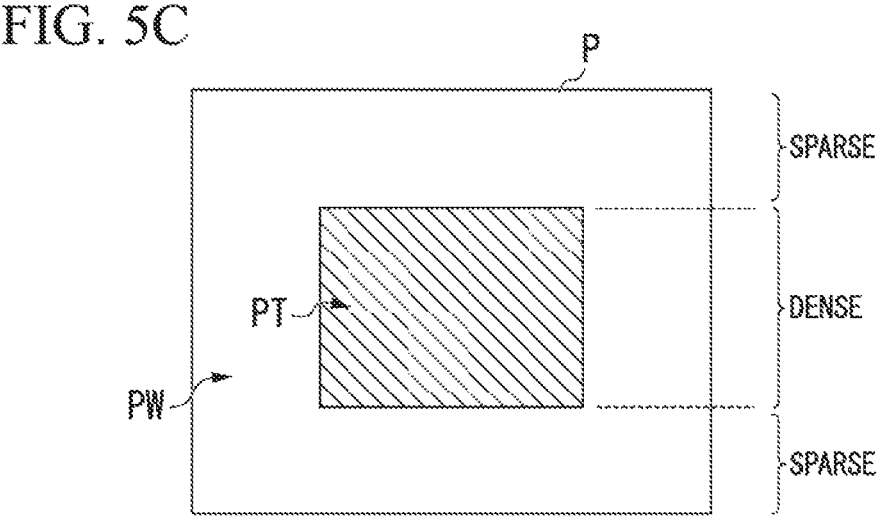
FIG. 5C is a diagram explaining an operation of the data transfer device according to the first embodiment of the present invention and explaining an example of image data to be transferred.

An imaging screen P shown in FIG. 5C includes a wide-angle image PW and a telephoto linage PT. In multi-recording, pixel data of the imaging screen P including the wide-angle image PW and the telephoto image PT is transferred. In multi-recording, the area of the telephoto image PT corresponds to an area in which images (pixel data to be transferred) are picked up. That is, pixel data of the area of the telephoto image PT is densely included in the input image data Di (as in a dense area). The other area (the area of the wide-angle image PW) corresponds to an area in which almost none image is picked up. That is, almost none pixel data of the other area (the area of the wide-angle image PW) is included in the input image data Di (as in a sparse area). Also in this case, areas (dense areas) in which pixel data is densely included and areas (sparse areas) in which pixel data is scarcely included are alternately present in input image data Di which is sequentially output from the image sensor 110 along the scanning line of the imaging screen P. The same applies to input image data which is acquired from the image sensor 110 by so-called digital zooming.

Figure 5D:
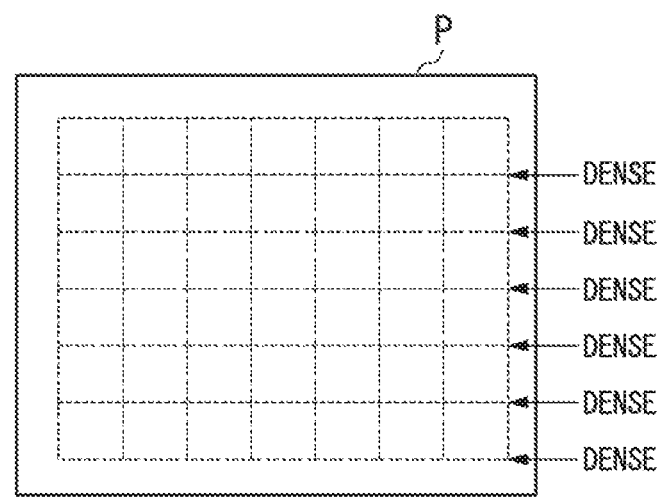
FIG. 5D is a diagram explaining an operation of the data transfer device according to the first embodiment of the present invention and explaining an example of image data to be transferred.

An imaging screen P shown in FIG. 5D includes a plurality of evaluation areas for acquiring evaluation values of exposure, white balance, or the like. In FIG. 5D, the plurality of evaluation areas ate indicated by dotted lines. Evaluation values are included in input image data Di corresponding to the last scanning line of each evaluation area. Therefore, evaluation values are densely included in the input image data Di corresponding to the last scanning line of each evaluation area. That is, pixel data for evaluation is densely included in an area corresponding to the last scanning line of each evaluation area (as in dense areas). Pixel data for evaluation is sparsely included in other areas (as in sparse areas). Therefore, also in this case, areas (dense areas) in which pixel data for evaluation is densely included and areas (sparse areas) in which pixel data for evaluation is scarcely included are alternately present in input image data Di which is sequentially output from the image sensor 110 along the scanning line of the imaging screen P.

Next, the operation when input image data Di forming an imaging screen P shown in FIGS. 5A to 5D has been input from the image sensor 110 to the data transfer device 10 in case (1) in which a DMA transfer request REQ output from the data transfer device 10 is rapidly received by the bus arbiter 161 and in case (2) in which it takes a long time until a DMA transfer request REQ is received will be described separately.

For ease of understanding, it is assumed that six pieces of pixel data are consecutively present in an area in which pixel data of input image data Di is densely included. It is also assumed that the input image data Di includes a plurality of groups, each including six consecutive pieces of pixel data. However, the present invention is not limited to this example and the arrangement of pieces of pixel data included in the input image data Di is arbitrary.

(1) When a DMA Transfer Receipt ACK is Rapidly Received

An operation when a DMA transfer receipt ACK is rapidly received will be described with reference to FIGS. 6A and 6B. Pixel data forming input image data Di output from the image sensor 110 is sequentially input from the image extraction unit 122 to the write control unit 11 of the data transfer device 10, which corresponds to the data transfer unit 125, in units of 64 bytes corresponding to pixel data of 32 pixels. The write control unit 11 writes the input image data Di to the buffer unit 12 in units of 64 bytes corresponding to 32 pixels as transfer data which is to be transferred to the common bus 180 (step S1). As shown in FIG. 6A, the write control unit 11 also outputs a write completion notification signal SW indicating that the input image data Di has been written to the buffer unit 12 each time pixel data of 64 bytes corresponding to 32 pixels included in the input image data Di is written to the buffer unit 12 (step S1).

In FIG. 6A, numerals in rectangles schematically showing write completion notification signals SW correspond to six pieces of pixel data which are densely included in the input image data Di. For example, a symbol "1" indicates a signal SW(1) which is output from the write control unit 11, the signal SW(1) being output when the beginning (first) of the six pieces of pixel data which are densely included in the input image data Di has been written to the buffer unit 12. The same symbols as those for the signal SW are applied to the read control signal SC. That is, in FIG. 6A, symbols "1" to "6" for the write completion notification signal SW indicate write completion notification signals SW(1) to SW(6). Symbols "1" to "6" for the read control signal SC indicate read control signals SC(1) to SC(6).

Subsequently, the band-smoothing unit 15 generates read control signals SC for reading transfer data from the buffer unit 12 based on write completion notification signals SW in order to smooth the band of the common bus 180 (step S2). As described above, the band-smoothing unit 15 sequentially inputs write completion notification signals SW which are sequentially output from the write control unit 11 to the FIFO memory 1501 shown in FIG. 3. Then, the band-smoothing unit 15 outputs the write completion notification signals SW held in the FIFO memory 1501, as read control signals SC at a constant time interval Ts in the same order as they were input.

In the example shown by FIG. 6A, the write completion notification signals SW(1) to SW(6) which are output from the write control unit 11 to the band-smoothing unit 15 and the read control signals SC(1) to SC(6) which are output from the band-smoothing unit 15 are schematically shown. The time interval Ts between the read control signals SC(1) to SC(6) is determined based on the maximum of the count value which is set in the counter 1503 shown in FIG. 3 described above.

In order to smooth the band of the common bus 180 (that is, to equalize intervals at which DMA transfer requests REQ output to the common bus 180 are transmitted) when pixel data is densely and sparsely present in the input image data Di, it is only needed to increase intervals at which DMA transfer requests REQ are transmitted when transferring input image data Di in which pixel data is densely present. From this viewpoint, the maximum of the count value is set in the counter 1503 shown in FIG. 3 such that the time interval Ts between read control signals SC is greater than the time interval between write completion notification signals SW. The time interval between write completion notification signals SW corresponds to the time interval between pieces of pixel data included in the input image data Di.

As the time interval Ts between read control signals SC increases, the time interval Tr between DMA transfer requests REQ increases, accordingly, there is a tendency for the data transfer speed to decrease. If the time interval Ts between read control signals SC is too great, processes accompanied by subsequent data transfer may be hindered. Therefore, the maximum of the count value of the counter 1503 is set within a range in which a necessary data transfer speed is achieved.

Subsequently, in response to a read control signal SC received from the band-smoothing unit 15, the read control unit 13 reads transfer data from the buffer unit 12 (step S3). In the case in which previous transfer data which has been read from the buffer unit 12 in response to a previous read control signal SC already exists, the read control unit 13 reads current transfer data from the buffer unit 12, on condition that a DMA transfer receipt ACK for a DMA transfer request REQ of the previous transfer data has been received by the interface unit 14.

When the read control unit 13 has read transfer data from the buffer unit 12, the interface unit 14 outputs a DMA transfer request REQ to the common bus 180 and the interface unit 14 transfers the transfer data read from the buffer unit 12 to the common bus 180 according to a predetermined bus protocol (step S4). Specifically, as shown in FIG. 6A, the interface unit 14 sequentially outputs six DMA transfer requests REQ in response to read control signals SC(1) to SC(6) which are received from the band-smoothing unit 15 at the constant time interval Ts.

Since it is assumed that DMA transfer requests REQ output from the interface unit 14 are rapidly received by the bus arbiter 161, the interface unit 14 receives a DMA transfer receipt ACK indicating that the current DMA transfer request REQ has been received by the bus arbiter 161 before output ting a next DMA transfer request REQ as shown in FIG. 6A. Then, the interface unit 14 transfers the transfer data, which has been read from the buffer unit 12 by the read control unit 13, to the common bus 180 (step S4).

In a situation in which DMA transfer requests REQ are rapidly received by the bus arbiter 161 as described above, input image data Di densely including six pieces of pixel data as a first group in FIG. 6B is output from the interface unit 14 to the common bus 180 as output transfer data Do at time intervals corresponding to the time interval Ts determined based on the maximum of the count value set in the counter 1503. In the example shown in FIG. 6B, data transfer of the pixel data of the first group is completed before input image data Di densely including pixel data of a second group following the first group is input.

Accordingly, in a situation in which DMA transfer requests REQ are rapidly received, smoothing the band of the common bus 180 creates a margin in the time interval Tr between DMA transfer request REQs. Therefore, when input image data Di in which pixel data is densely present is transferred, the bus arbiter 161 can appropriately adjust and receive DMA transfer requests REQ of each functional block. It is possible to reduce a burden on the bus arbiter 161.

Even if the time interval Tr between DMA transfer requests REQ is set to be long when input image data Di in which pixel data is densely present is transferred, data transfer of pixel data of each group is performed without interference therebetween. Therefore, even if the band of the common bus 180 is smoothed, it is possible to transfer pixel data of the image sensor 110 to the DRAM 163 according to arbitration of the bus arbiter 161 without lowering the data transfer speed.

In the example of FIGS. 6A and 6B, by smoothing the band of the common bus 180, the frequency at which the common bus 180 is occupied by the functional block which transfers pixel data acquired from the image sensor 110 to the DRAM 163 is reduced, and the frequency at which the bus arbiter 161 receives DMA transfer requests REQ of other functional blocks is increased. Therefore, even it the bus arbiter 161 performs arbitration such that the priority of the functional block which transfers pixel data of the image sensor 110 to the DRAM 163 is set high, it is possible to suppress the influence on processes of other functional blocks and to prevent stagnation of processes of the other functional blocks.

(2) When It Takes a Long Time Until a DMA Transfer Request REQ is Received

Next, an operation when it takes a long time until a DMA transfer receipt ACK for a DMA transfer request is received will be described with reference to FIGS. 7A and 7B.

The symbols for the write completion notification signal SW and the read control signal SC are the same as those of the case shown in the example of FIGS. 6A and 6B.

Similar to the above case in which DMA transfer receipt ACKs are rapidly received, the write control unit 11 sequentially outputs a write completion notification signal SW each time input image data Di including pixel data acquired from the image sensor 110 is written to the buffer unit 12 (step S1). In response to write completion notification signals SW output from the write control unit 11, the band-smoothing unit 15 sequentially outputs read control signals SC at a constant time interval Ts (step (S2). In response to a read control signal SC output from the band-smoothing unit 15, the read control unit 13 reads transfer data from the buffer unit 12 (step S3). In response to the read control signal SC, the interface unit 14 outputs a DMA transfer request REQ for the transfer data read by the read control unit 13 and transfers the transfer data (step S4).

Hereinafter, a situation is considered that it takes a long time until a first DMA transfer request REQ output from the interface unit 14 in response to a first read control signal SC(1) is received by the bus arbiter 161, for example due to congestion of the common bus 180. In the example shown in FIG. 7A, it takes a long time until the first DMA transfer request REQ output from the interface unit 14 at time t0 is received by the bus arbiter 161 at time t1. As a result, the DMA transfer receipt ACK for the first DMA transfer request REQ is received by the interface unit 14 at time t1 after a third read control signal SC(3) is output.

Once the DMA transfer receipt ACK is received by the interface unit 14 at time t1, the read control unit 13 reads next transfer data from the buffer unit 12 in response to a second read control signal SC(2) in the above-described step S3. Then, the interface unit 14 outputs a DMA transfer request REQ for the transfer data read by the read control unit 13 in response to the second read control signal SC(2) and transfers the transfer data to the common bus 180 in the above-described step S4.

In this case, pieces of transfer data read from the buffer unit 12 by the read control unit 13 in response to the second and subsequent read control signals SC(2) to SC(6) are temporarily stagnated. In the example of FIG. 7B, it takes a long time for the bus arbiter 161 to receive the DMA transfer request REQ for the transfer data read from the buffer unit 12 in response to the first read control signal SC(1), and therefore the transfer of pieces of transfer data Do(2) to Do(6) which are to be transferred in response to the second and subsequent read control signals SC(2) to SC(6) is stagnated.

However, according to the first embodiment, if the situation in which DMA transfer requests REQ are rapidly received is restored, transfer of the stagnated transfer data is rapidly performed at short time intervals and thus delay of the transfer of transfer data can be recovered from as will be described below.

The following is a detailed explanation. In the example of FIG. 7A, at time t1, the second read control signal SC(2) and the third read control signal SC(3), in addition to the first read control signal SC(1), have already been output from the band-smoothing unit 15 to the read control unit 13. Therefore, when a DMA transfer receipt ACK for the first piece of transfer data read from the buffer unit 12 in response to the first read control signal SC(1) is received, the read control unit 13 instantly reads the next transfer data from the buffer unit 12 in response to the second read control signal SC(2) in the above-described step S3. Then, in the above-described step S4, the interface unit 14 outputs a DMA transfer request REQ for the transfer data read in response to the second read control signal SC(2) to the common bus 180 and transmits the transfer data to the common bus 180.

As long as the situation in which DMA transfer requests REQ are rapidly received is maintained after the time t1, DMA transfer requests REQ are output from the interface unit 14 at minimum time intervals without being limited by the maximum of the count value of the counter 1503. Therefore, the stagnated second and subsequent transfer data is rapidly transferred such that delay of the transfer of transfer data can be recovered.

In the example shown in FIG. 7B, delay of data transfer of pixel data of a first group is recovered from before input image data Di densely including pixel data of a second group subsequent to the first group is input. Thus, it is possible to prevent an influence on processes due to transfer delay of the first piece of transfer data of the first group.

Therefore, according to the first embodiment, it is possible to rapidly perform stagnated data transfer while effectively utilizing the band of the common bus 180.

(Second Embodiment)

Next, a second embodiment of the present invention will be described.

Figure 8:
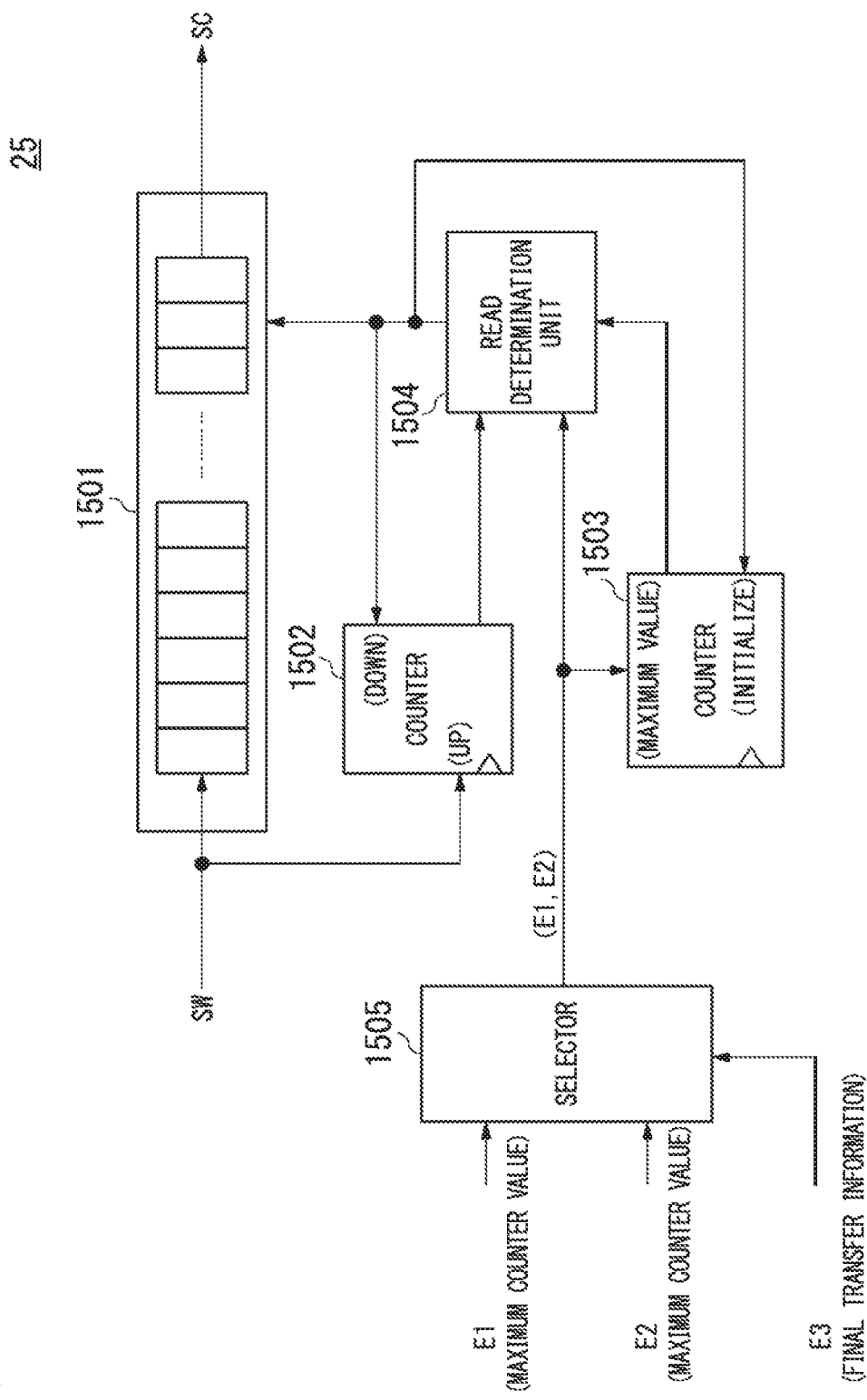
FIG. 8 is a block diagram showing an exemplary configuration of a band-smoothing unit included in a data transfer device according to a second embodiment of the present invention.

FIG. 8 is a block diagram showing an exemplary configuration of a band-smoothing unit 25 included in a data transfer device according to the second embodiment of the present invention.

The band-smoothing unit 25 according to the second embodiment furtherly includes a selector 1505 with respect to the components of the band-smoothing unit 15 according to the first embodiment shown in FIG. 3 described above. Other configurations are the same as those of the band-smoothing unit 15 in the first embodiment.

For example, setting signals E1 and E2 of two types are input to the selector 1505 from the central processing unit 170 shown in FIG. 1. A setting signal E3 is also input to the selector 1505 from the image extraction unit 122. The setting signal E1 is the same as the setting signal E of the first embodiment described above, which is a signal for setting the maximum of the count value of the counter 1503. The setting signal E2 is a signal for setting the maximum of the count value of the counter 1503 similar to the setting signal E1.

However, the maximum of the count value set by the setting signal E2 is smaller than the maximum of the count value set by the setting signal E1. Therefore, the time interval Ts between DMA transfer requests REQ when the maximum of the count value of the counter 1503 is set by the setting signal E2 is shorter than when the maximum of the count value of the counter 1503 is set by the setting signal E1.

The setting signal E3 is a signal including final transfer information indicating that transfer data read from the buffer unit 12 by the read control unit 13 is a final piece of transfer data. When the final transfer information included in the setting signal E3 indicates the final piece of transfer data, the selector 1505 selects and outputs the setting signal E2 to the counter 1503 and the read determination unit 1504. In other cases, the selector 1505 selects and outputs the setting signal E1 to the counter 1503 and the read determination unit 1504.

When extracting image data from input image data Di (input image data preprocessed by the preprocessing unit 1215, the image extraction unit 122 determines whether the input image data Di is a final piece of transfer data in a frame. When the input image data Di is not the final piece of transfer data, the image extraction unit 122 outputs a setting signal E3 including final transfer information indicating that the input image data Di is not the final piece of transfer data to the selector 1505 of the band-smoothing unit 25. In this case, the selector 1505 selects and outputs the setting signal E1 to the counter 1503 and the read determination unit 1504.

On the other hand, when the input image data Di (input image data preprocessed by the preprocessing unit 121) is the final piece of transfer data in the frame, the image extraction unit 122 outputs a setting signal E3 including final transfer information indicating that the input image data Di is a final piece of transfer data to the selector 1505. In this case, the selector 1505 of the band-smoothing unit 25 selects and outputs the setting signal E2 to the counter 1503 and the read determination unit 1504.

By providing the above-described selector 1505, when normal data transfer other than the final data transfer is performed, the band-smoothing unit 25 operates to smooth the band of the common bus 180, similar to the first embodiment. Regarding the final data transfer, a small value is set as the maximum of the count value of the counter 1503 by the setting signal E2, such that the time interval Ts between read control signals SC is shortened and the time interval Tr between DMA transfer requests REQ is also shortened. In this case, band smoothing of the common bus 180 is suppressed, but it is possible to prevent interference with subsequent data transfer. Therefore, according to the second embodiment, it is possible to smooth the band of the common bus while suppressing data interference between frames.

(Third Embodiment)

Next, a third embodiment of the present invention will be described.

Figure 9:
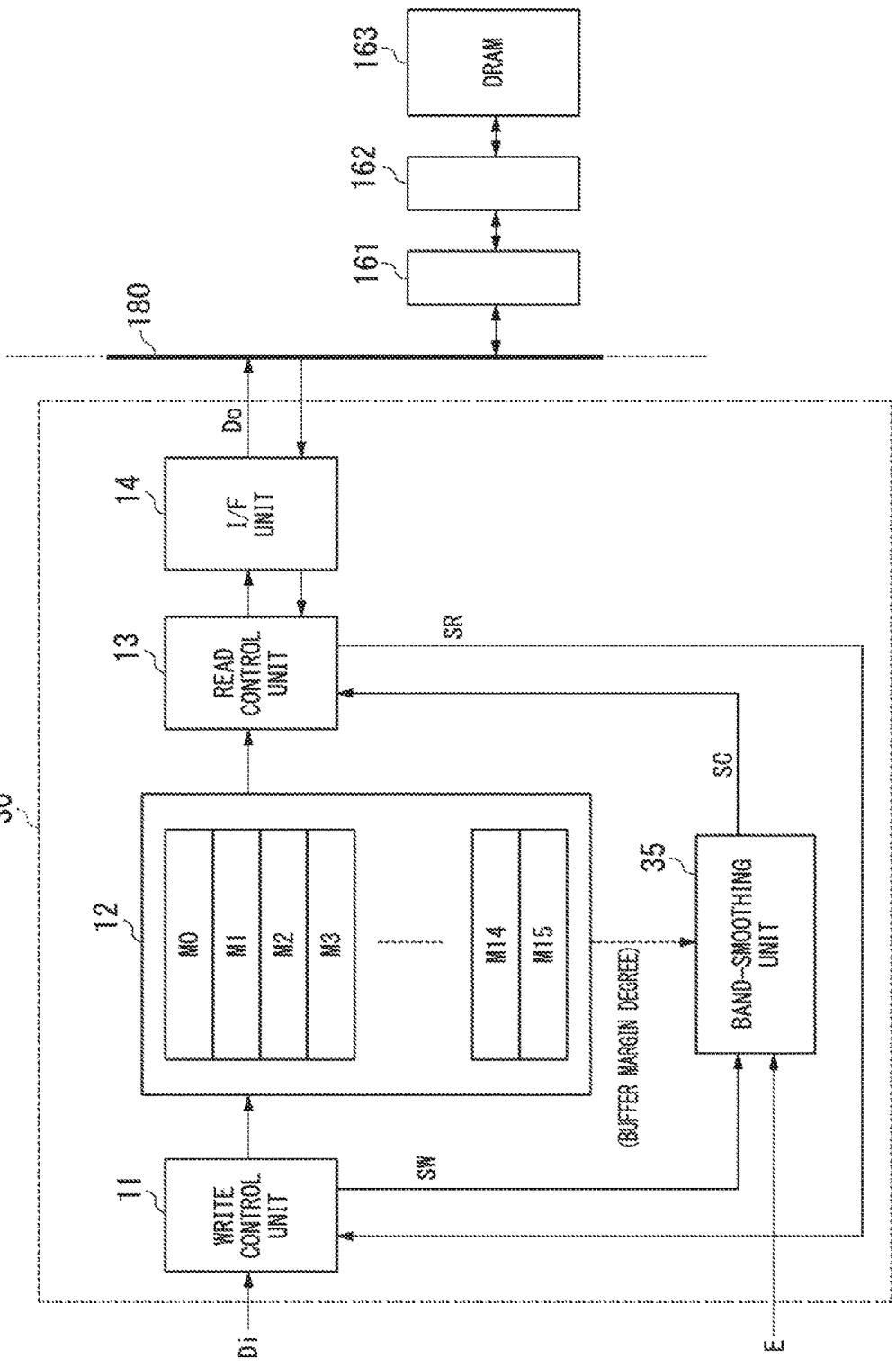
FIG. 9 is a block diagram showing an exemplary configuration of a data transfer device according to a third embodiment of the present invention.

FIG. 9 is a block diagram showing an exemplary configuration of a data transfer device 30 according to the third embodiment of the present invention. The data transfer device 30 includes a band-smoothing unit 35 instead of the band-smoothing unit 15 in the configuration of the data transfer device 10 shown in FIG. 2 according to the first embodiment described above. The other components of the data transfer device 30 are the same as those of the data transfer device 10 of the first embodiment.

Figure 10:
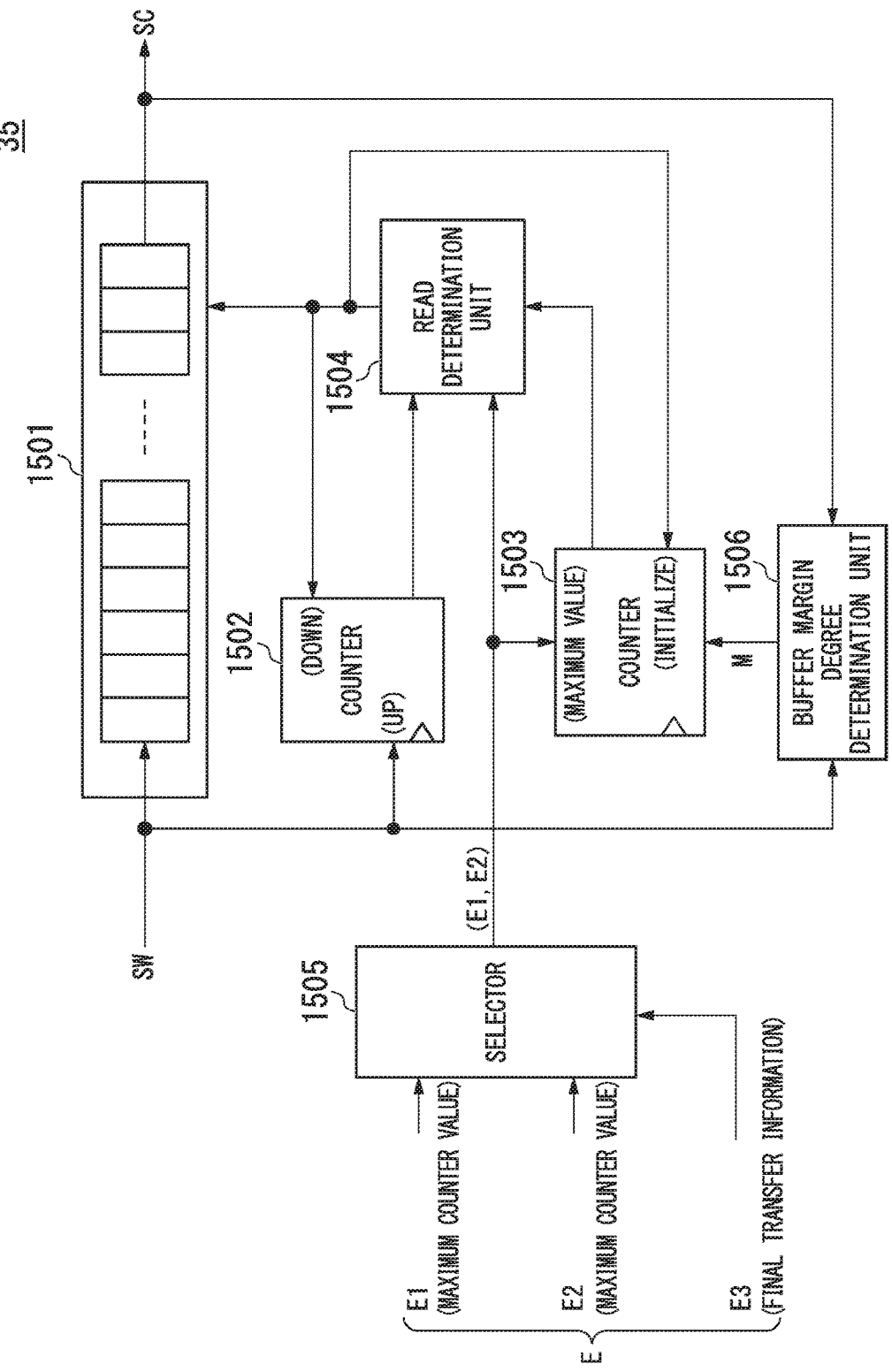
FIG. 10 is a block diagram showing an exemplary configuration of a band-smoothing unit included in the data transfer device according to the third embodiment of the present invention.

FIG. 10 is a block diagram showing an exemplary configuration of the band-smoothing unit 35 included in the data transfer device 30 according to the third embodiment of the present invention. The band-smoothing unit 35 furtherly includes a buffer margin degree determination unit 1506 with respect to the components of the band-smoothing unit 25 shown in FIG. 8 according to the second embodiment described above. The other components of the band-smoothing unit 35 are the same as those of the band-smoothing unit 25 of the second embodiment.

The buffer margin degree determination unit 1506 determines a remaining capacity (a buffer margin degree) of the buffer unit 12. The band-smoothing unit 35 adjusts time intervals (time intervals Ts1 and Ts2 set by the setting signals E1 and E2) between pieces of transfer data which are transferred to the common bus 180 according to the determination result of the buffer margin degree determination unit 1506. Specifically, the band-smoothing unit 35 decreases the time interval Ts between pieces of transfer data as the remaining capacity of the buffer unit 12 decreases. In the third embodiment, the band-smoothing unit 35 sets the time interval between read control signals SC according to the setting signals E1 and E2, similar to the second embodiment, and also adjusts the time interval of read control signals SC according to the remaining capacity of the buffer unit 12.

It is noted that the adjustment of the time interval between read control signals SC by the setting signals E1 and E2 may be omitted, in such a case, band smoothing of the common bus 180 is not performed.

The band-smoothing unit 35 acquires the remaining capacity of the buffer unit 12 from the difference between the number of write completion notification signals SW (that is, the number of pieces of data written to the buffer unit 12) and the number of read control signals SC (that is, the number of pieces of data read from the buffer unit 12) and the band-smoothing unit 35 determines the remaining capacity of the buffer unit 12 from the acquired remaining capacity. The fact that the remaining capacity of the buffer unit 12 is small indicates that it is highly likely that data cannot be written to the buffer unit 12 and it is also highly likely that the function of the buffer unit 12 is impaired. The buffer margin degree determination unit 1506 outputs a signal M indicating the remaining capacity (buffer margin degree) of the buffer unit 12 to the counter 1503. In the third embodiment, the signal M indicates whether there is a margin in the remaining capacity of the buffer unit 12, the remaining capacity is small, or there is almost no remaining capacity.

FIG. 11 is a diagram explaining an operation of the band-smoothing unit 35 included in the data transfer device 30 according to the third embodiment of the present invention and also explaining the relationship between the remaining capacity of the buffer unit 12 and time intervals Ts11 (=Ts1), Ts12 and Ts13 between pieces of transfer data.

The counter 1503 adjusts the maximum of the count value set according to the setting signals E1 and E2 based on a signal M received from the buffer margin degree determination unit 1506. In the example of FIG. 11, when the signal M indicates that there is a margin in the remaining capacity of the buffer unit 12, the band-smoothing unit 35 sets, as the time interval Ts between read control signals SC, a time interval Ts11 obtained by multiplying a time interval Ts1 determined based on the setting signal E1 by a first predetermined factor "1". In this case, the time interval Ts between pieces of transfer data Do which are transferred to the common bus 180 is set to the same value as the time interval Ts1.

When the signal M indicates that the remaining capacity of the buffer unit 12 is small at time t31, the band-smoothing unit 35 sets, as the time interval Ts between read control signals SC, a time interval Ts12 obtained by multiplying the time interval Ts1 determined based on the setting signal E1 by a second predetermined factor "0.5". In this case, the time interval Ts between pieces of transfer data Do which are transferred to the common bus 180 is set to a half of the time interval Ts1 (=Ts1×0.5).

When the signal M indicates that there is almost no remaining capacity of the buffer unit 12 at time t32, the band-smoothing unit 35 sets, as the time interval Ts between read control signals SC, a time interval Ts13 obtained by multiplying the time interval Ts1 determined based on the setting signal E1 by a third predetermined factor "0.2". Thus, the time interval between pieces of transfer data Do which are transferred to the common bus 180 is set to one fifth of the time interval Ts1 (=Ts1×0.2).

In the above described example, the numerical values of the first to third factors are merely an example and the numerical value of each factor can be arbitrarily set so long as the remaining capacity of the buffer unit 12 can be adjusted.

As the remaining capacity of the buffer unit 12 indicated by the signal M decreases, the band-smoothing unit 35 decreases the time interval Ts1 between read control signals SC set by the setting signal E1 and decreases the time interval Ts1 between pieces of transfer data as described above. The same applies to the time interval Ts2 between pieces of transfer data set by the setting signal E2. As a result, the speed of reading from the buffer unit 12 increases relative to the speed of writing to the buffer unit 12, thereby increasing the remaining capacity of the buffer unit 12.

According to the third embodiment, the time interval Ts between pieces of transfer data is controlled according to the remaining capacity of the buffer unit 12 and therefore it is possible to achieve a reliable operation of writing data to the buffer unit 12 and to reliably maintain the buffering function of the buffer unit 12.

Next, the effects of the first to third embodiments described above will be verified by comparison with the technology according to Japanese Unexamined Patent Application, First Publication No. 2006-39672 1.

Figure 12A:
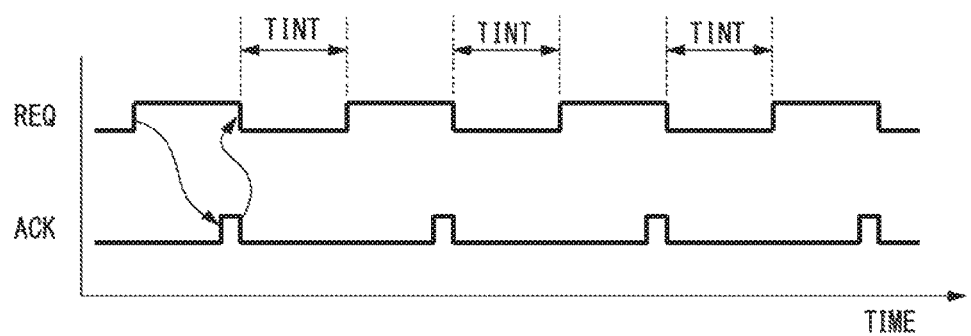
FIG. 12A is a diagram explaining an exemplary operation of a data transfer device according to the related art to supplement the explanation of the effects of the data transfer device according to the embodiments of the present invention, the diagram including a timing chart explaining an operation when it takes a short time until a DMA transfer request is received.
Figure 12B:
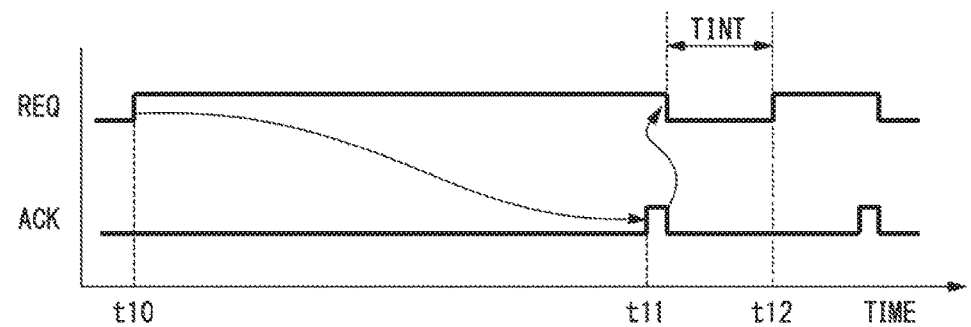
FIG. 12B is a diagram explaining an exemplary operation of a data transfer device according to the related art to supplement the explanation of the effects of the data transfer device according to the embodiments of the present invention, the diagram including a timing chart explaining an operation when it takes a long time until a DMA transfer request is received.

FIGS. 12A and 12B are diagrams explaining an exemplary operation of a data transfer device according to the related art to supplement the explanation of the effects of the data transfer device according to the embodiments of the present invention. FIG. 12A is a timing chart explaining an operation when it takes a short time until a DMA transfer request is received. FIG. 12B is a timing chart explaining an operation when it takes a long time until a DMA transfer request is received.

According to the technology of Japanese Unexamined Patent Application, First Publication No. 2006-39672 1, a time interval TINT between DMA transfer requests REQ is fixed to a constant value as shown in FIG. 12A. Therefore, as shown in FIG. 12B, when it takes a long time until a DMA transfer receipt ACK is received at time t11 after a first DMA transfer request REQ is output to the common bus at time t10, the next DMA transfer request REQ is output at time t12 at a predetermined time interval TINT from the first DMA transfer request REQ. In other words, even if the first DMA transfer request REQ is received, the next DMA transfer request REQ is not output until the time corresponding to the constant time interval TINT has elapsed. Therefore, it is not possible to rapidly transfer the transfer data that has been stagnated until the first DMA transfer request REQ is received.

On the other hand, according to the first to third embodiments of the present invention described above, in a situation in which it takes a long time until a DMA transfer request REQ is received, the time interval Tr between DMA transfer requests REQ is not limited to the time interval Ts between read control signals SC output from the band-smoothing unit 15 and DMA transfer requests REQ are output at minimum time intervals. Therefore, it is possible to rapidly output DMA transfer requests REQ subsequent to a DMA transfer request REQ which takes a long time to be received by the bus arbiter 161. Accordingly, even if it takes a long time to receive a DMA transfer request REQ, it is possible to rapidly transfer the transfer data that has been stagnated during that time and thus it is possible to suppress a decrease in the data transfer speed.

According to the first to third embodiments of the present invention described above, in a situation in which DMA transfer requests REQ are rapidly received, the time interval Tr between DMA transfer requests REQ is set according to the time interval Ts between read control signals SC output from the band-smoothing unit 15 in order to smooth the band of the common bus 180. Even if the time interval Tr between transfer requests REQ is set as described above, pieces of pixel data of each group do not interfere with each other as shown in FIG. 7A and therefore the data transfer speed is not impaired.

Thus, according to the above embodiments, smoothing the common bus 180 makes it possible to receive DMA transfer requests REQ of low-priority functional blocks and makes it possible to recover from data transfer delay even if a situation occurs in which a DMA transfer request REQ of a high-priority functional block is not received for a long time. Thus, it is possible to preferentially perform processes of high-priority functional blocks and to effectively prevent stagnation of processes of low-priority functional blocks.

The following is a summary of the main effects of the embodiments of the present invention.

According to the first to third embodiments of the present invention, it is possible to rapidly transfer stagnated data while effectively utilizing the band of the common bus 180. According to the second embodiment of the present invention, it is possible to smooth the band of the common bus while suppressing data interference between frames. According to the third embodiment of the present invention, the time interval Ts between pieces of transfer data is adjusted according to the remaining capacity of the buffer unit 12 and therefore it is possible to achieve a reliable buffer function of the buffer unit 12.

It is possible to output DMA transfer requests REQ according to the amount of transfer data held in the buffer unit 12 such that it is possible to flexibly smooth, the band of the common bus 180 according to the amount of transfer data.

Even when a DMA transfer request is not received for a long time, it is possible to suppress the stagnation of processing of transfer data as buffering of the transfer data.

It is possible to control the band of the common bus 180 before output ting a DMA transfer request REQ, thus facilitating control of the band of the common bus 180.

Furthermore, there is no need to provide a complicated circuit for controlling the time interval Tr between DMA transfer requests REQ and therefore it is possible to reduce the scale of the circuitry.

In a situation in which DMA transfer requests REQ are rapidly received by the bus arbiter 161, it is possible to smooth the band of the common bus 180. Therefore, it is possible to secure processes of low-priority functional blocks while performing processes of high-priority functional blocks under arbitration of the bus arbiter 161.

Even if a situation occurs that it takes a long time until a DMA transfer request REQ is received by the bus arbiter 161, delay caused by the stagnated data transfer, since it takes a long time until a DMA transfer request REQ is received, can be recovered thereafter if the situation in which DMA transfer requests REQ are rapidly received by the bus arbiter 161 is restored.

When input image data Di in which pixel data is densely and sparsely present is input, it is possible to smooth the band of the common bus 180 by spreading DMA transfer requests REQ over the time axis.

In the case in which the priority of each functional block is set in the bus arbiter according to how high the data rate due to DMA transfer is, even if there are consecutive DMA transfer requests of a high-priority functional block, the bus arbiter can receive DMA transfer requests of other low-priority functional blocks. Therefore, bus ownership is not occupied solely by high-priority functional blocks and low-priority functional blocks can secure bus ownership. It is thus possible to prevent stagnation of processes of low-priority functional blocks.

With a simple configuration, it is possible to flexibly adjust the time interval Tr between DMA transfer requests REQ.

Even if the rule of arbitration of the bus arbiter 161 is changed, the band of the common bus 180 can be flexibly smoothed by adjusting the maximum of the count value of the counter 1503 by the setting signal E.

Although preferred embodiments of the present invention have been described above, the present invention is not limited to these embodiments and modifications thereof. Additions, omissions, substitutions, and other changes of constituent components are possible without departing from the spirit of the present invention. The present invention is not limited by the foregoing description, but is only limited by the scope of the appended claims.

What is claimed is:

1. A data transfer device, comprising:
    a buffer unit configured to temporarily store transfer data that is to be transferred to a common bus;
    a write control unit configured to write input data as the transfer data to the buffer unit and the write control unit configured to output a notification signal indicating that the input data has been written to the buffer unit;
    a read control unit configured to read the transfer data from the buffer unit;
    an interface unit configured to transfer the transfer data read from the buffer unit by the read control unit to the common bus according to a predetermined bus protocol; and
    a band-smoothing unit configured to smooth a band of the common bus by delaying the notification signal, generating a read control signal for controlling a timing at which the transfer data is read from the buffer unit, and outputting the read control signal to the read control unit,
        wherein when previous transfer data which has been read from the buffer unit in response to a previous read control signal already exists and a DMA transfer receipt ACK in response to a DMA transfer request REQ of the previous transfer data is received by the interface unit, the read control unit reads current transfer data from the buffer unit,
    wherein the band-smoothing unit is configured to sequentially output the notification signals as the read control signals to the read control unit at a predetermined time interval by delaying the notification signals which are sequentially output from the write control unit according to a process that pieces of pixel data forming the input data are sequentially written to the buffer unit by the write control unit.

2. The data transfer device according to claim 1, wherein the band-smoothing unit includes:
    a FIFO memory configured to hold the notification signals sequentially output from the write control unit;
    a first counter configured to count the number of the notification signals that have not been read among the notification signals held in the FIFO memory in response to each of the notification signals sequentially output from the write control unit;
    a second counter configured to count a count value up by ones at a predetermined period for providing the predetermined time interval until a predetermined count value is reached, the second counter being initialized at a timing at which the FIFO memory is read; and a read determination unit configured to read the notification signal from the FIFO memory, the notification signal having not been read from the FIFO memory, and the read determination unit configured to output the notification signal as the read control signal, when the count value of the second counter has reached the predetermined count value and the count value of the first counter indicates that the notification signal which has not been read from the FIFO memory is present in the FIFO memory.

3. A data transfer method, comprising:

a first step of writing input data to a buffer unit as transfer data that is to be transferred to a common bus and outputting a notification signal indicating that the input data has been written to the buffer unit;

a second step of delaying the notification signal and generating a read control signal for reading the transfer data from the buffer unit such that a band of the common bus is smoothed;

a third step of reading the transfer data from the buffer unit in response to the read control signal; and a fourth step of transferring the transfer data read from the buffer unit to the common bus according to a predetermined bus protocol, wherein when previous transfer data which has been read from the buffer unit in response to a previous read control signal already exists and a DMA transfer receipt ACK in response to a DMA transfer request REQ of the previous transfer data is generated, the third step furtherly includes a step of reading current transfer data from the buffer unit, wherein the notification signals are sequentially output as the read control signals at a predetermined time interval by delaying the notification signals which are sequentially output during the first step according to a process that pieces of pixel data forming the input data are sequentially written to the buffer unit.

* * * * *